United States Patent [19]
Jarvis et al.

[11] Patent Number: 6,076,871
[45] Date of Patent: Jun. 20, 2000

[54] RESILIENT BUFFER

[76] Inventors: Barry Michael Frank Jarvis; Carolyn Elice Morse, both of 9144 Spring Branch Dr. #101, Houston, Tex. 77080

[21] Appl. No.: 08/945,150
[22] PCT Filed: Apr. 19, 1996
[86] PCT No.: PCT/GB96/00949
    § 371 Date: Nov. 13, 1997
    § 102(e) Date: Nov. 13, 1997
[87] PCT Pub. No.: WO96/33117
    PCT Pub. Date: Oct. 24, 1996

[30] Foreign Application Priority Data

Apr. 19, 1995 [GB] United Kingdom .................. 9507996
Nov. 2, 1995 [GB] United Kingdom .................. 9522497

[51] Int. Cl.[7] .................................................... B60R 19/02
[52] U.S. Cl. ........................ 293/123; 293/102; 256/13.1; 404/6
[58] Field of Search .................................. 293/102, 120, 293/121, 123, 142, 143, 144, 145, 130; 267/139, 140; 256/13.1, DIG. 5, DIG. 6; 52/729.1; 904/6, 7, 9, 10; 213/220, 222

[56] References Cited

U.S. PATENT DOCUMENTS

| 402,429 | 5/1889 | Fellows ......................... 256/DIG. 5 X |
| 563,539 | 7/1896 | Young ............................ 256/DIG. 5 X |
| 592,146 | 10/1897 | Kempton ........................ 256/DIG. 5 X |
| 969,143 | 8/1910 | Newcomb ................................. 293/130 |
| 1,414,813 | 5/1922 | Johnstone ................................. 293/123 |
| 1,419,318 | 7/1922 | Singer ....................................... 293/123 |
| 1,467,383 | 9/1923 | Lyon ......................................... 293/130 |
| 1,520,951 | 12/1924 | Igo ......................................... 293/143 X |
| 1,597,019 | 8/1926 | Cox ......................................... 293/130 |
| 1,722,782 | 7/1929 | Barber ..................................... 293/123 |
| 2,030,782 | 2/1936 | Dennebaum . |
| 2,037,215 | 4/1936 | Andrea ..................................... 293/130 |
| 3,262,240 | 7/1966 | Schuman et al. .................. 256/13.1 X |
| 3,704,861 | 12/1972 | Glaesener ............................... 256/13.1 |
| 4,289,301 | 9/1981 | Akabame et al. ..................... 256/13.1 |
| 4,307,973 | 12/1981 | Glaesener ........................... 256/13.1 X |
| 5,460,115 | 10/1995 | Speer et al. ........................... 404/10 X |
| 5,813,663 | 9/1998 | Victor et al. .................. 256/DIG. 6 X |

FOREIGN PATENT DOCUMENTS

| 1280695 | 10/1968 | Germany . |
| 2112040 | 7/1983 | United Kingdom . |
| 2148358 | 5/1985 | United Kingdom . |

*Primary Examiner*—Joseph D. Pape
*Attorney, Agent, or Firm*—Barnes & Thornburg

[57] ABSTRACT

A resilient buffer formed from strip-like material comprises hollow elongate first and second sections which extend transverse to each other. The first section has spaced apart limbs and the second section also has spaced apart limbs. The spaced apart limbs of the first section are joined at one pair of adjacent ends and the spaced apart limbs of the second section are also joined at one pair of adjacent ends. The spaced apart limbs of the first section are joined to the respective spaced apart limbs of the second section to form a closed loop. The closed loop is open at the sides thereof so as to enable relative flexing to take place between the first and second sections.

34 Claims, 9 Drawing Sheets

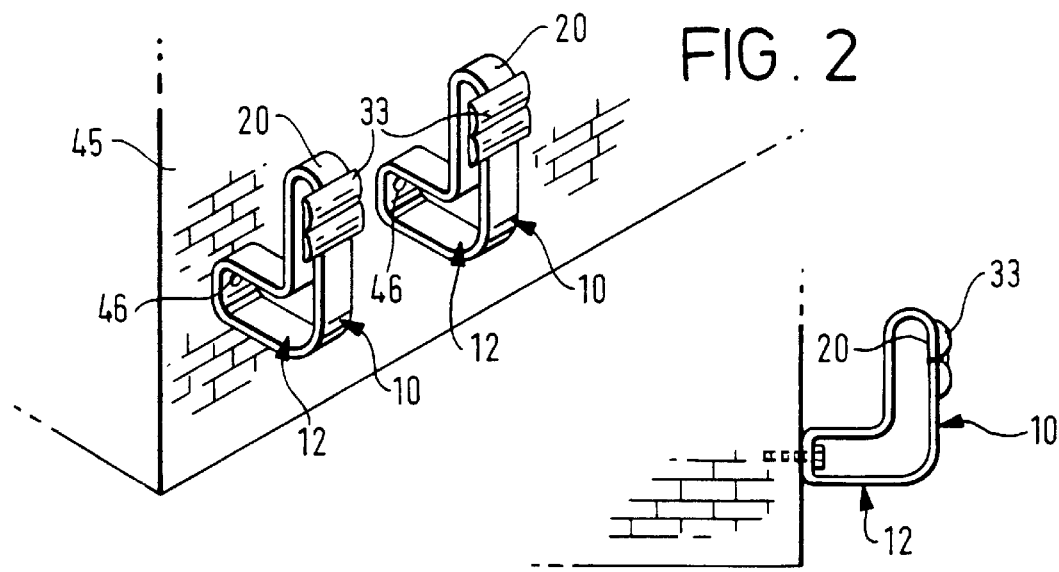
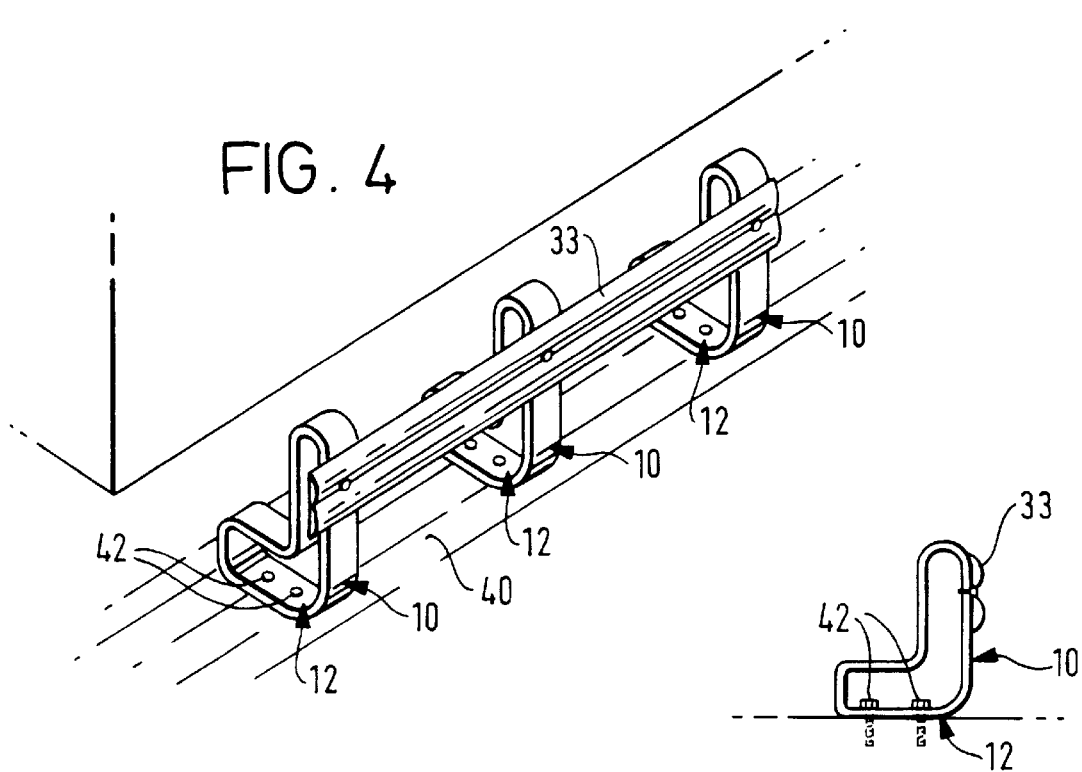

RESILIENT BUFFER

CROSS REFERENCES TO RELATED APPLICATIONS

This application is a U.S. national application of international application serial No. PCT/GB96/00949 filed Apr. 19, 1996, which claims priority to British Serial No. 9507996.8 filed Apr. 19, 1995, and British Serial No. 9522497.8 filed Nov. 2, 1995.

The invention relates to a resilient buffer and is particularly, but not exclusively, concerned with a buffer for reducing the effects of vehicular impact.

A resilient buffer for reducing the effect of vehicular impact is known from GB-A-2 112 040. The buffer is formed from a resilient material and is in U-shaped form. Limbs of the U-shape define a space between free ends thereof which closes when the buffer is subjected to sufficient impact. Such an arrangement relies on the resilience of a single vertical limb of the buffer to provide the initial impact resistance. The displacement of that limb following impact is resisted only by a single flex zone at the foot of the limb between the limb and a fixing section and at which bending occurs following the impact. Only after the space closes will the other limb provide further resistance. An object of the present invention is to provide an improved form of buffer.

According to an aspect of the invention there is provided a buffer comprising a length of resilient material bent to form a closed loop, the loop having a fixing section and an impact section transverse to the fixing section.

According to a second aspect of the invention there is provided a resilient buffer comprising hollow elongate first and second sections which extend transverse to each other, the first section having spaced apart limbs, and the second section also having spaced apart limbs, the spaced apart limbs of the first section being joined at one pair of adjacent ends, the spaced apart limbs of the second section also being joined at one pair of adjacent ends, the spaced apart limbs of the first section being joined to the respective spaced apart limbs of the second section to form a closed loop, which enables relative flexing to take place between the first and second sections.

The closed loop arrangement is advantageous as it provides a progressively increasing resistance to impact dissipating energy to all the elements of the loop.

Preferably, the closed loop defines a plurality of flex zones about which flexing of the buffer occurs. In such a case, relative displacement may occur between two of such flex zones during flexing of the buffer. Preferably at least one of the flex zones is formed at a juncture between the first and second sections.

In one embodiment the elongate first and second sections are arranged such that the closed loop is substantially L-shaped. In that case the flex zones are preferably defined at inboard positions on the L-shaped closed loop.

The L-shaped loop may comprise two spaced apart L-shaped portions and two end portions extending between ends of the two L-shaped portions. The end portions comprise further flex zones.

Preferably the first section defines an impact section and the second section defines a fixing section. The fixing section is preferably shorter than the impact section of the L-shaped loop. The second section may define two fixing sections, one said fixing section being transverse to the other. An end portion between the two L-shaped portions, where provided, may form a second fixing section. The first and second fixing sections are preferably arranged adjacent each other.

Preferably, corners at a mid position of the L-shape are rounded and form flex zones. Where the loop comprises two L-shaped portions and end portions, the end portions may also be rounded at least in part. Where one of the end portions forms a said fixing section, the fixing section is preferably formed in a flat part of that end portion.

The impact section may carry an impact element such as a crash rail, a rubber bumper pad, a bumper bar or the like.

In another embodiment, the loop may be substantially I-shaped. In such an arrangement it is preferred that the first section forms a base of the I-shape and the second section forms an upstanding web of the I-shape, two said flexible zones being formed at a juncture between the base and the web. In that case the web may form an impact section of the buffer. Preferably eight flex zones are provided by the I-shaped form. The I-shaped buffer may be arranged to absorb impact from both sides thereof. In that case two impact sections may be provided, one each side of the buffer. Each such impact section preferably carries an aforesaid impact element.

In a further embodiment the loop of resilient material is associated with a resilient element for increasing the resistance to impact.

In that respect and according to another aspect of the invention there is provided a buffer comprising a closed loop of resilient material having a fixing section and an impact section transverse to the fixing section, the loop of resilient material being associated with a resilient element for increasing the resistance to impact.

The resilient element may be arranged within the closed loop. The resilient element may take the form of a second closed loop. In the latter case, the closed loops may fit one within the other, preferably closely one within the other. In such a case, the two loops may fit frictionally one within the other. Where there is frictional contact between the two loops in that way, deflection of the buffer is arranged to generate friction between the two loops. Where two loops are provided the inner closed loop may be substantially similar in shape to the outer closed loop.

Alternatively or additionally, the resilient element may comprise a length of resilient material which may frictionally engage one or more internal or external surface portions of the loop. The length of resilient material may be substantially similar in shape to the closed loop.

In another embodiment, the resilient element may comprise a spring extending across the closed loop, whereby deflection of the loop causes deflection of the spring thereby increasing the resistance to impact. If desired, a plurality of springs may be provided.

Where a spring is provided, it may be provided in addition to a further closed loop and/or the aforesaid length of resilient material.

The resilient element may take the form of a resilient stop mounted on part of the closed loop and spaced from a displaceable section of the loop such that when the displaceable section has been displaced by a given amount as a result, say, of impact, the displaceable section will move into contact with the stop.

Where the loop is L-shaped, a plurality of the aforesaid springs may be provided so as to extend between spaced apart limbs of one section of the L-shape and spaced apart limbs of the other section of the L-shape respectively.

The buffer may be used in a set comprising a plurality of buffers fixed to a mounting in spaced apart manner. Where an impact element is provided, a single impact element may be common to said plurality of buffers.

The buffer may be mounted on a vehicle to minimise the effect of impact. For example, if the buffer is mounted on the rear of the vehicle, the buffer can help to reduce the effect of the impact of another vehicle running into the rear of the vehicle and contacting the buffer. Also, if the buffer carrying vehicle is reversed towards a loading dock or bay, the buffer can nudge the dock or bay structure and the resilience of the buffer reduces the risk of damage to the vehicle or dock structure.

The buffer may be fixed to a wall, floor or other static support to provide impact protection. In such a case, a plurality of such buffers may be used to provide a highway crash barrier, the impact sections of the buffers preferably carrying horizontal crash rails common to a plurality of the buffers.

A rigid stop arrangement may be provided for the buffer. The rigid stop may comprise a first stop surface for limiting deflection of the buffer in a first direction and a second stop surface for limiting or preventing deflection of the buffer in an opposite direction. The stop arrangement may comprise a pair of rigid elongate members which are attached to a mounting at one end and which are joined together at opposite ends. The elongate members may have portions thereof which are cut away so as to leave respective stop surfaces. One of the first and second sections of the buffer preferably fits within the stop arrangement so that one of the limbs thereof lies between the respective stop surfaces. The rigid stop arrangement is preferably used in conjunction with the buffer when the buffer is used as a rear bumper bar mounting on a commercial vehicle. In such a case, the elongate members may extend downwardly from the underside of a load carrying surface of the vehicle to which the buffer is attached. Preferably, two buffers and respective associated rigid stop arrangements are mounted on the vehicle at spaced apart positions, the buffers carrying a common bumper bar. Preferably, the bumper bar extends outboard of the two buffers.

The length of resilient material forming the loop may be heat treated steel, such as spring steel, and may be in strip form.

The or each fixing section may be formed with one or more fixing holes or recesses for receiving suitable fastening means.

Where the buffer has therein a further resilient element such as a second closed loop or a length of resilient material, an impact member such as bumper bar may be attached to the buffer by a fastener which passes through respective apertures formed in one of the limbs of the buffer and in the resilient element, one of said apertures being larger than the other to permit relative movement to take place between the limb and the element during deflection of the buffer.

Buffers in accordance with the invention will now be described by way of example with reference to the accompanying drawings in which:

FIG. 1 is a side view of a preferred form of buffer in accordance with the invention, FIGS. 2 and 3 show perspective and side views respectively of the buffer of FIG. 1 fixed to a vertical wall, FIGS. 4 and 5 show perspective and side views respectively of the buffer of FIG. 1 fixed to a horizontal surface, FIG. 6 is a perspective view of the buffer of FIG. 1 used singularly on a horizontal surface and provided with an alternative form of bumper, FIG. 7 is a perspective view of the rear end of a vehicle provided with FIG. 1 type buffers and an interconnecting bumper bar, FIG. 8 is a side view of the arrangement shown in FIG. 7, FIGS. 9 to 11 show alternative embodiments of buffers in accordance with the invention, FIG. 12 shows a buffer in accordance with the present invention and comprising two loops arranged one within the other, FIG. 13 is a buffer of the kind shown in FIG. 12 with the addition of an L-shaped resilient element, FIG. 14 is a buffer of the kind shown in FIG. 1 with the addition of a resilient stop, FIGS. 15 and 16 show the way in which buffers of the kind shown in FIGS. 13 and 14 respectively can be provided with resilient stops, FIG. 17 shows a buffer of the kind shown in FIG. 1 incorporating two helical compression springs, FIG. 18 shows a buffer of the kind shown in FIG. 12 incorporating two helical compression springs, FIG. 19 shows a buffer of the kind illustrated in FIG. 16 incorporating two helical compression springs, FIG. 20 shows a buffer of the kind shown in FIG. 1 incorporating two solid or pneumatic springs, FIG. 21 is a buffer of the kind shown in FIG. 12 having a bumper bar fitted thereto, FIG. 22 is a view to a larger scale showing an alternative fixing for the bumper bar as shown in FIG. 21, FIG. 23 illustrates a buffer of the kind shown in FIG. 12 incorporating a crash barrier rail, FIG. 24 shows a buffer of the kind shown in FIG. 12 connected to a mounting adaptor and stop arrangement, FIG. 25 is a rear view of a vehicle having spaced apart buffers thereon of the kind shown in FIG. 24 and FIG. 26 is a side view of another form of buffer in accordance with the invention.

Looking at FIG. 1, it can be seen that the buffer is of generally L-shaped form having an elongate vertical section indicated generally at 10 and an elongate horizontal section indicated generally at 12. The sections 10, 12 constitute the aforesaid hollow elongate first and second sections. The buffer is formed by bending a single strip of steel, such as spring steel, into the L-shaped form, the free ends of the strip (not shown) finally being joined together by welding or by some other suitable means. It will be seen, therefore, that the buffer basically comprises first and second and L-shaped portions 16, 17 which are effectively joined together by two end portions 18, 19. If desired, two or more strips of material can be welded together to form the buffer.

The buffer has a vertical front limb 20, a rounded first flex zone 22 inboard of the free ends of sections 10, 12, a lower horizontal limb 23 formed with spaced apart fixing apertures 24 and providing a fixing section for fixing the buffer to a horizontal surface. The ends of the strip are preferably joined by welding between the apertures 24. The buffer further comprises a rounded second flex zone 25 forming a lower rear corner, a flat part 26 formed with a fixing aperture 27 and a third flex zone 28 forming an upper rounded rear corner. The buffer also comprises a horizontal upper limb 29, a fourth flex zone 30 inboard of the free ends of sections 10, 12, a vertical rear limb 32 and a fifth flex zone provided by the end portion 18 joining the limbs 20, 32. The vertical front limb 20 and vertical rear limb 32 constitute the aforesaid spaced apart limbs of the first section 10. The horizontal lower limb 23 and the horizontal upper limb 29 constitute the aforesaid spaced apart limbs of the second section 12.

The front vertical limb 20 carries one or more guards or crash rails 33 or, as shown in FIG. 6 and in broken lines in FIG. 1, a rubber bumper 36. The rails 33 or bumper 36 can be secured in position using a bolt hole 37.

FIG. 1 shows the buffer fixed to a horizontal surface 40 by means of fixing bolts 42 which pass through the holes 24.

When the buffer is subjected to impact in the direction of arrow I, the impact force is resisted in shear by the bolts 42 and is instantaneously transmitted through the entire buffer by deflecting the vertical section 10 rearwardly in the direction of arrow I about the flex zone 22, the force travelling through the curved end portion 18, along the limb 32 causing the flex zone 30 to flex and move inwardly towards the flex zone 22 as shown in broken lines. The force travels through the upper horizontal limb 29 causing it to move inwardly and downwardly as shown in broken lines, through the flex zone 28, through the flat part 29 and through flex zone 25 into the lower horizontal limb 23 which is secured by the bolts 42. It will be appreciated that although the individual limbs of the buffer are themselves flexible, flexing is concentrated primarily at the flex zones of the buffer, such as flex zones 22, 30 as the buffer is deflected.

Therefore, it will be appreciated that the load resulting from the impact travels around the deflecting buffer which provides a gradually increasing resistance to deflection and rate of energy absorbtion as each limb of the buffer begins to deflect. Therefore, the buffer is advantageous over that in GB-A-2 112 046 which relies on the resistance provided by a single flex zone to resist initial impact. The greater the load of impact, the greater will be the deflection of the various limbs of the buffer thereby further compressing the closed loop spring to provide substantial impact absorbtion capacity.

When the impact load has reached a maximum and the load has been absorbed and dissipated through the buffer, the resilience of the closed loop causes the various limbs to move in a reverse sense so that the loop returns to the full line position as shown in FIG. 1.

Instead of fixing the loop to the horizontal surface 40 by means of bolts 42 in the holes 24, the buffer can be fixed to a vertical surface 45 as shown in FIGS. 2 and 3 by means of a fixing bolt 46 passing through the hole 27. As shown in FIG. 3, buffers can be spaced apart with their vertical limbs 20 carrying a crash rail 33 common to both buffers.

As shown in FIGS. 4 and 5, buffers mounted on the horizontal surface 40 can also be spaced apart for carrying a common crash rail 33.

If desired, the buffers can be arranged singularly on a vertical surface or on a horizontal surface 40 as shown in FIG. 6. In such a case, the vertical limb 20 can conveniently carry the rubber bumper 36.

The vertical surface 45 may take the form of a concrete parapet, wall, steel stanchion or column and may carry rubber bumpers 36 instead of the crash rail 33.

The horizontal surface 40 may comprise the surface of a car park, road or other surface where means for providing impact resistance is required. Where the buffers are used individually as shown in FIG. 6, the spaces between individual buffers are easily accessible to pedestrians but the buffers themselves are ideally spaced apart to prevent passage of a vehicle therebetween.

FIGS. 7 and 8 show the way in which the buffer can be fitted in an inverted manner to the rear of a vehicle such as a semi or articulated trailer bed 49. As shown clearly from FIG. 8, at least the rubber bumper 36 projects beyond the end of the vehicle so as to minimise damage resulting from a rear end impact with another vehicle. If desired, and as shown in FIG. 7, the buffers may carry a bumper bar 50 extending across the rear of the vehicle. Obviously, if rear end impact is made with the bumper bar 50, the impact will be absorbed by both of the buffers. It is not essential to mount the rubber bumpers 36 on the buffers. However, they are particularly useful to minimise the risk of damage due to impact. For example, where the vehicle is reversed towards a structure such as a loading dock, the use of the buffer and bumper 36 permits the driver to nudge the dock structure with the rubber bumpers 36 enabling the vehicle to be parked tightly against the dock structure without damage to the trailer or dock structure.

As will be appreciated from the foregoing description, the use of the resilient closed loop is considerably advantageous over the type of buffer described in GB-A-2 112 040 as the energy due to impact is absorbed by the buffer as a whole from the point of initial impact.

FIGS. 9 and 10 show alternative forms of the buffer to that shown in FIG. 1. In FIG. 9, the buffer has fixing holes 24 for horizontal fixing whereas in FIG. 10, the buffer has two vertically spaced holes 27 for vertical fixing. Effectively, FIG. 1 combines the fixing features of both of those buffers.

FIG. 11 shows an alternative closed loop arrangement viewed from the side and formed from suitable strip material. The buffer in FIG. 11 provides a closed loop of substantially L-shaped configuration but with vertical limbs 80, 82 tapering towards each other in the downward direction as viewed.

Looking at FIG. 12, it will be seen that the buffer of FIG. 1 has an inner loop 11a of material nested therein. The inner loop 11a is a close fit within the outer loop 11 and the two loops preferably frictionally inter-engage. If desired, fixing bolts can extend through both of the loops 11, 11a to secure them in position. In such a case, the fixing bolts may pass through holes in the outer loop 11 and oversized holes or slots in the inner loop 11a whereby on deflection of the buffer as shown in broken lines in FIG. 12, the two loops may slide over each other in the directions shown by the arrows S in FIG. 12. The horizontal section 12 of the buffer shown in FIG. 12 may be fixed to the horizontal surface 40 by bolts 42 or may be fixed to a vertical surface by other appropriately placed bolts (not shown). In that case the horizontal section 12 constitutes the aforesaid fixing portion. As the buffer is deflected as shown in broken lines in FIG. 12, the addition of the inner loop 11a provides an increased resistance to deflection. Friction between the contiguous surfaces of the two loops 11, 11a increases that resistance further and also provides a certain amount of damping in the resilient loop.

FIG. 13 shows the way in which an L-shaped length of material 100 is secured to the inside of the inner loop 11a with its two sections 101 and 102 in contact with the inner loop 11a. Preferably, the fixing bolts (not shown) for holding together the inner and outer loops 11, 11a also secure the element 100 in position. If desired, the element 100 could be arranged externally of the loop in contact with the L-shaped section 16 of that loop. The provision of the L-shaped element 100 increases further the resistance to deflection. The fixing bolts passing through the two loops 11, 11a may pass through slots or oversize holes in the element 100 so that the loops and the element can all move relative to each other during deflection of the buffer. Preferably, friction is generated between the contiguous surfaces of the outer and inner loops 11, 11a and the surfaces of the element 100 which creates a damping effect.

FIG. 14 shows the way in which the buffer of FIG. 1 can be used in conjunction with a back stop 110. The back stop comprises a base member 111 and a stop member 112 which extends upwardly from the base member at an acute angle. The upper end of the stop member 112 is turned outwardly slightly to present a convex surface 113 directed towards and spaced from the vertical section 10 of the buffer. The horizontal section 12 of the buffer may be secured to the horizontal surface 40 by bolts 42 as in FIG. 12 which also pass through the base member 111 of the resilient back stop 110. Significant deflection of the buffer as indicated in broken lines will bring the vertical section 10 into contact with the convex surface 113 which may then itself deflect to present additional resistance to further deflection of the buffer.

FIGS. 15 and 16 show the way in which the resilient stop 110 can be used in conjunction with the buffers shown in FIGS. 12 and 13.

In FIG. 17, the buffer shown in FIG. 1 incorporates helical compression springs 120 and 122. The spring 120 extends under compression between the vertical limbs of the L-shaped portions 16, 17 and the spring 122 extends in compression between the horizontal limbs of the L-shaped portions 16, 17. During deflection of the resilient buffer as shown in broken lines, the springs 120, 122 will be compressed further thereby providing additional resistance to buffer deflection.

Figure 17:
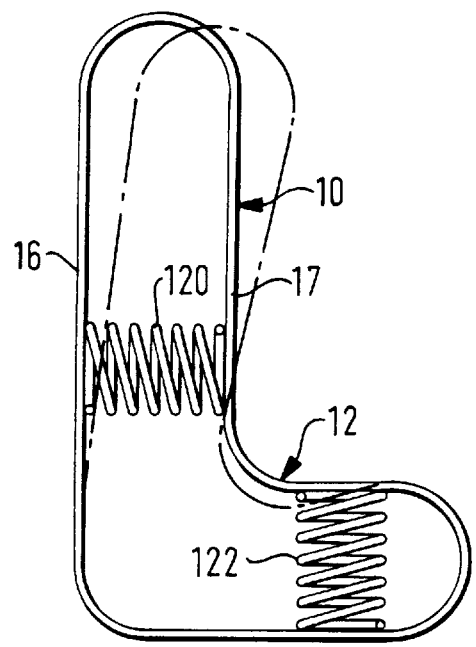
Figure 18:
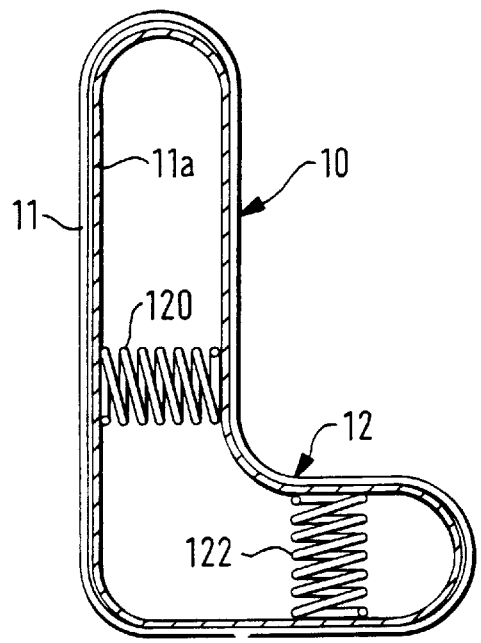
FIG. 18 shows the way in which the springs 120, 122 can be arranged within a buffer of the kind shown in FIG. 12 to provide additional resistance to deflection.
Figure 19:
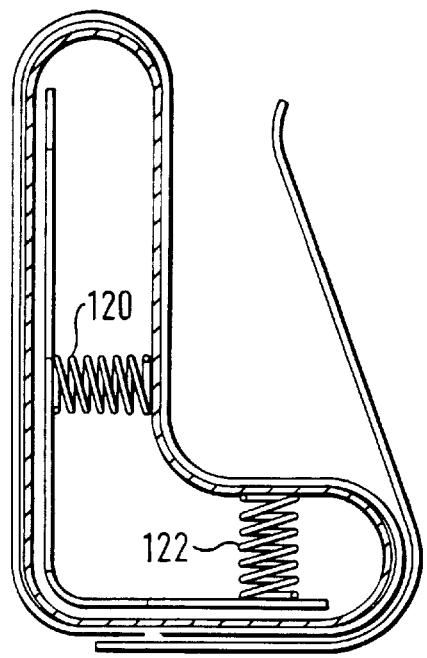
FIG. 19 shows the way in which the buffer shown in FIG. 16 can incorporate springs 120, 122 to provide additional resistance to deflection.
Figure 20:
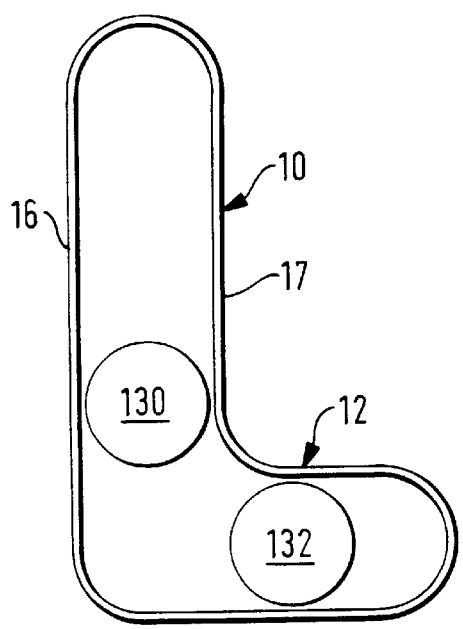

FIG. 20 is a view similar to FIG. 17 where the helical compression springs 120 have been replaced by solid rubber or inflatable rubber elements 130, 132. The element 130 is positioned between the vertical limbs of the L-shaped portions 16, 17 and the element 132 is positioned between the horizontal limbs of the L-shaped portions 16, 17. Preferably, the elements 130, 132 are arranged in compression between the limbs.

Figure 1:
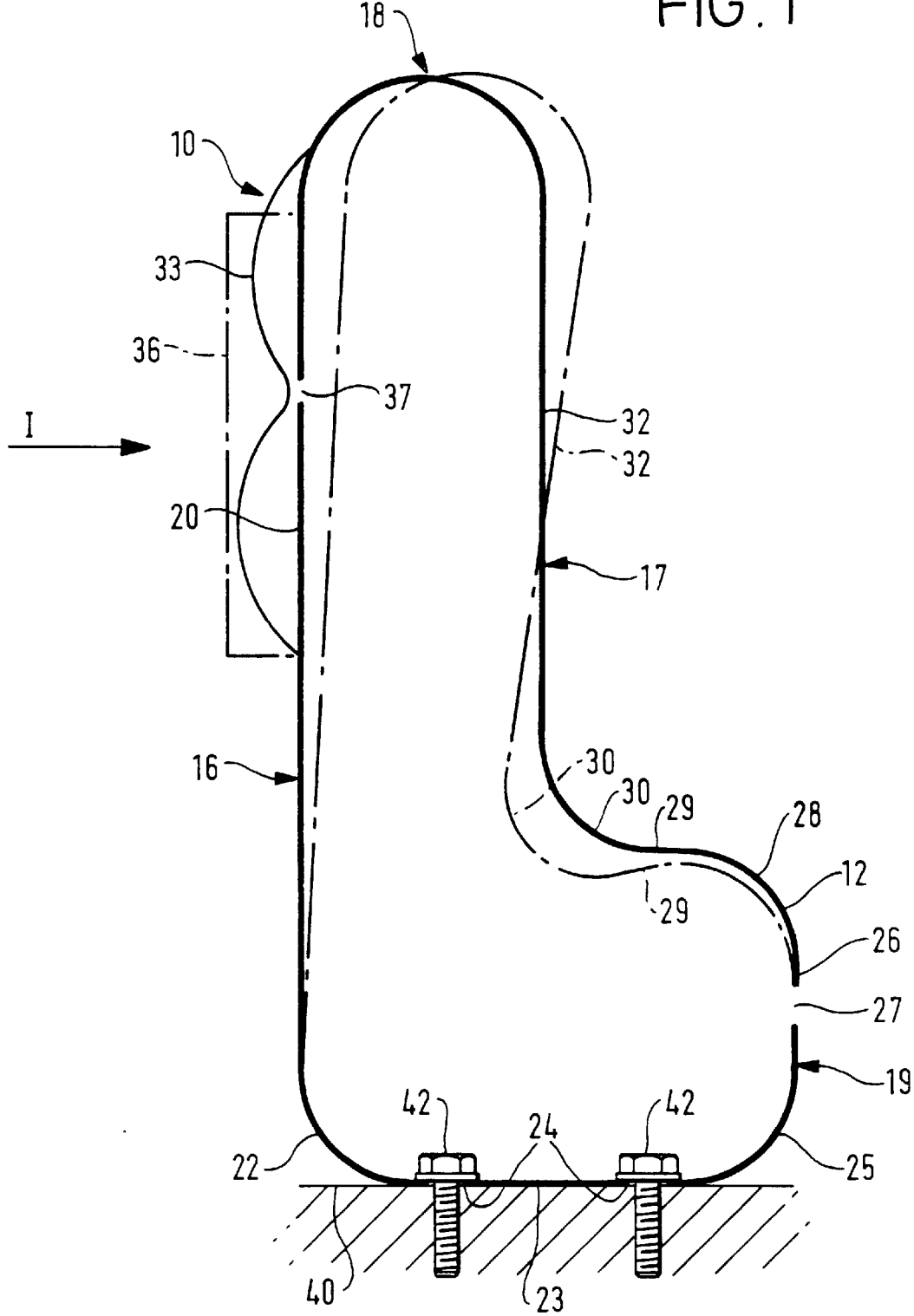
Figure 6:
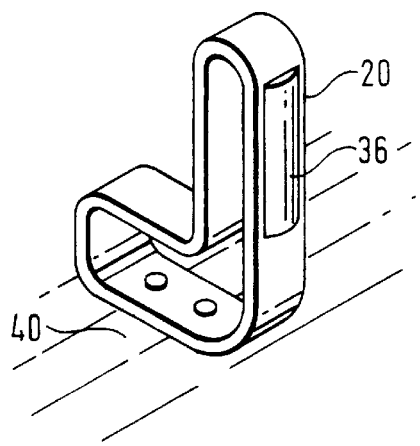
Figure 7:
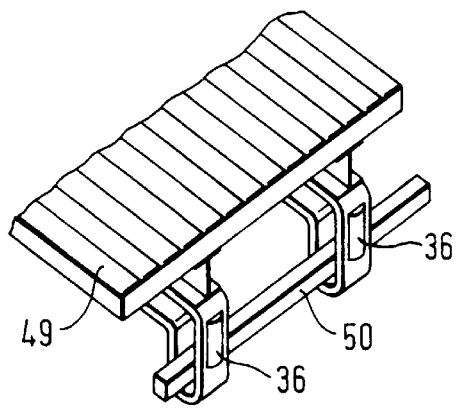
Figure 8:
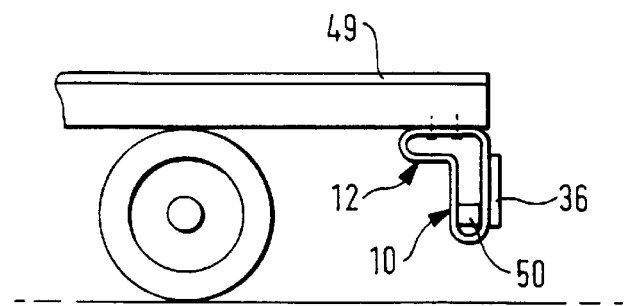
Figure 9:
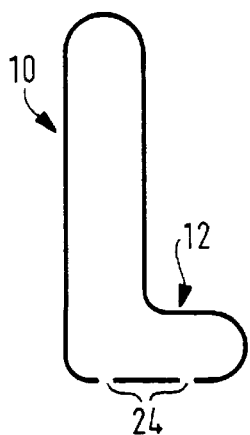
Figure 10:
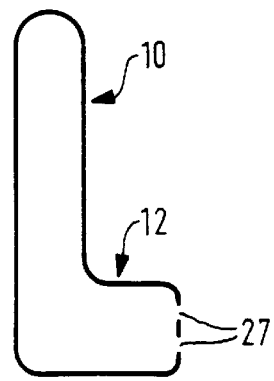
Figure 11:
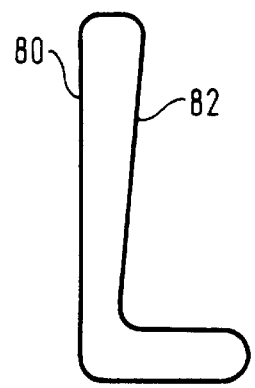
Figure 12:
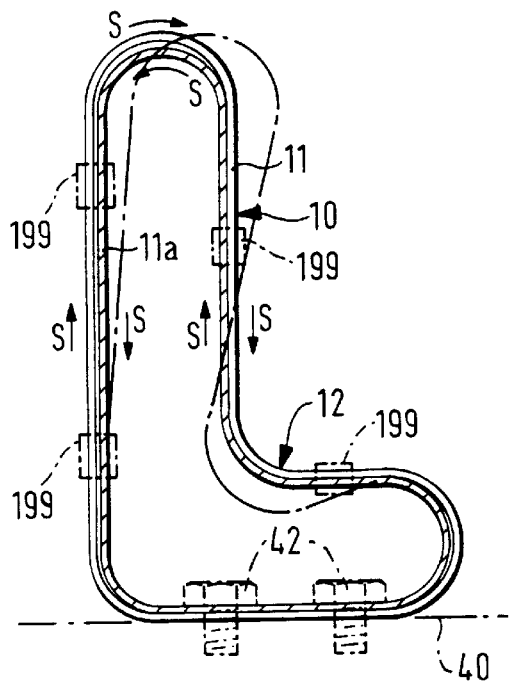
Figure 21:
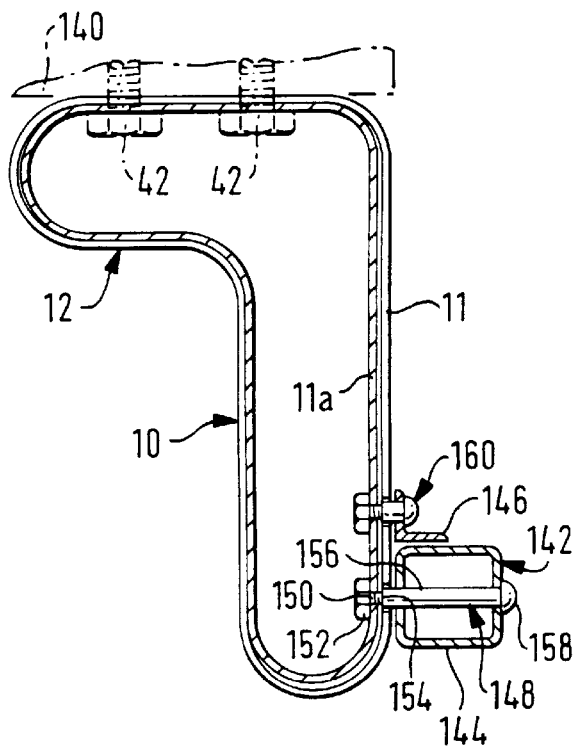

In FIG. 21, a buffer of the kind shown in FIG. 12 is inverted and attached to a surface such as the chassis 140 or the underside of a load carrying section of a commercial vehicle. The horizontal section 12 of the buffer is fixed to the chassis 140, for example by bolts 42.

Figure 24:
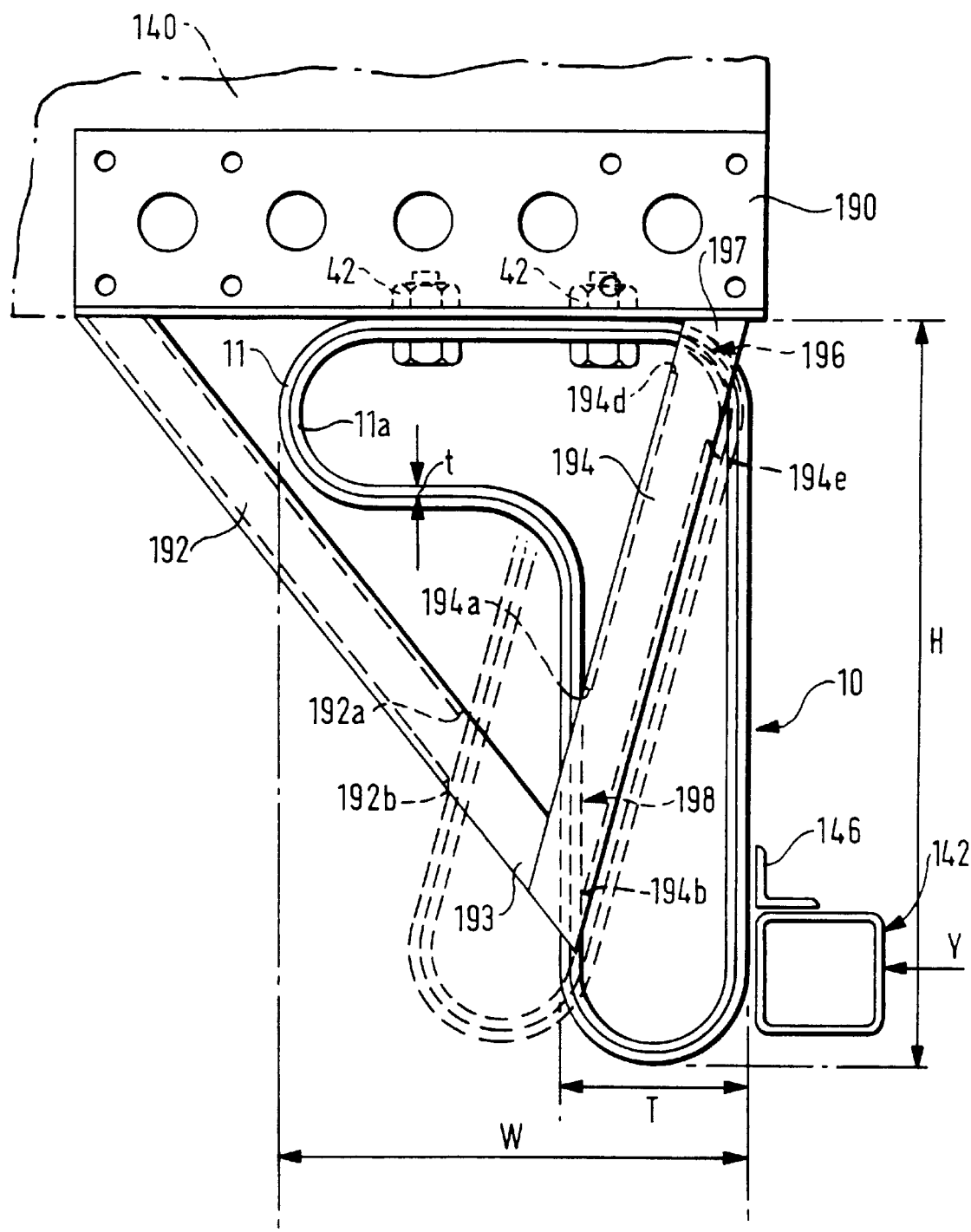

The vertical section 10 carries a bumper bar 142 comprising a square cross-section tube 144 having a length of angle 146 welded to its upper surface as viewed in FIG. 24. The bumper bar 142 has apertures formed in opposite vertical sides thereof for receiving an elongate bolt 148. The bolt 148 is formed with a reduced diameter screw-threaded section 150 which receives a nut 152. The reduced diameter section 150 passes through a bore formed in the inner loop 11a and the inner loop is then held securely between the nut 150 a shoulder 154 formed on a shank 156 of the bolt 148. The shank 156 passes with clearance through the outer loop 11 and the bumper bar 142 is held captive between the outer loop 11 and a head 158 of the bolt 148. A further bolt 160 passes through the angle 146 and passes through the loops 11, 11a in the same way as the bolt 148. The bolt 160 then secures the angle 146 to the buffer. During deflection of the buffer due to impact against the bumper bar 142, the clearance between the bolts 148, 160 and the edges of the apertures in the outer loop 11 permit relative movement to occur between the inner and outer loops.

Figure 22:
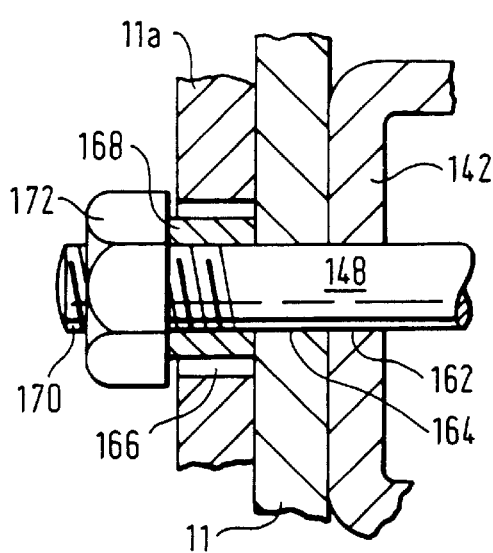

FIG. 22 shows an alternative fixing configuration for the bumper bar 142. In FIG. 22, the bolt 148 is not formed with a reduced diameter portion but simply passes without significant clearance through apertures 162 and 164 in the bumper bar 142 and outer loop 11 respectively. The bolt also extends through a slot or oversize hole 166 in the inner loop 11a and receives a sleeve 168 over its screw threaded section 170. A nut 172 is tightened against the adjacent end of sleeve 168 so as to hold the bumper bar 142 firmly against the outer loop 11. During deflection of the buffer, the slot or oversize hole 166 allows the loops 11, 11a to move relative to each other.

Figure 23:
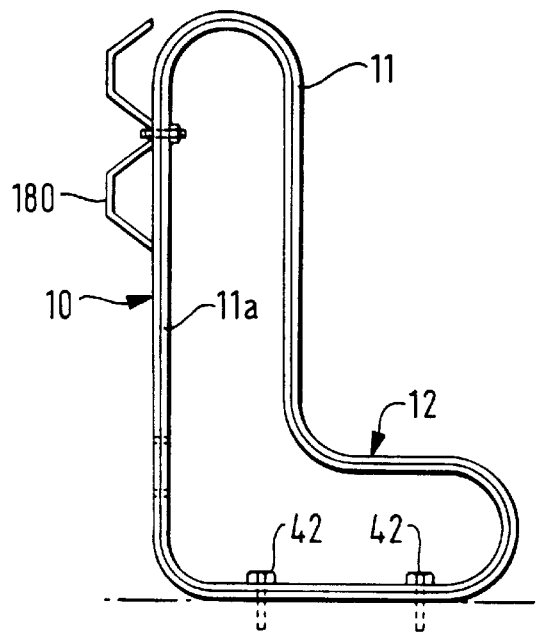

FIG. 23 shows the way in which a loop of the kind shown in FIG. 12 can carry a barrier rail 180 which is suitably secured to the buffer. Bolts 42 can be used to secure the horizontal section 12 to a surface such as the ground and a single barrier rail 180 may be fixed at spaced apart intervals to the vertical limbs 10 of a plurality of the buffers.

In FIG. 24, a buffer of the kind shown in FIG. 21 is attached to a mounting adaptor 190 which is itself attached to the chassis 140 or a load carrying section of a commercial vehicle. The mounting adaptor 190 carries front and rear stop members 192 and 194 respectively. The front stop member 192 is formed from square cross-section tubing and is welded at its upper end as viewed in the drawings to the mounting adaptor 190. The front stop member 192 then extends downwardly at an acute angle to the mounting adaptor 190 and the upper and lower surfaces of the square cross-section tube are cut away at the lower end of the tube to form front travel limit stops 192a, 192b. By cutting away the upper and lower surfaces, spaced apart sides 193 remain for welding to the lower end of the rear stop member 194. The rear stop member 194 is also made from square cross-section tubing and has its upper and lower surfaces cut away at the lower end to form rear limit travel stops 194a, 194b and cut away at positions 194d and 194e at the upper end.

The buffer and rear stop member 194 are assembled together during manufacture so that a curved section 196 of the buffer fits with working clearance between spaced apart sides 197 at the upper end of the rear stop member 194 and a vertical section 198 of the section 10 of the buffer fits with working clearance between the sides 197 at the lower end of the rear stop member 194. With the buffer and rear stop member 194 assembled together in that way, the upper ends of the sides 197 can then be welded to the mounting adaptor 190 and the lower ends of the sides 197 can be welded to the sides 193 of the front stop member 192. The section 12 of the buffer is secured to the adaptor plate 190, for example by bolts 42.

Figure 25:
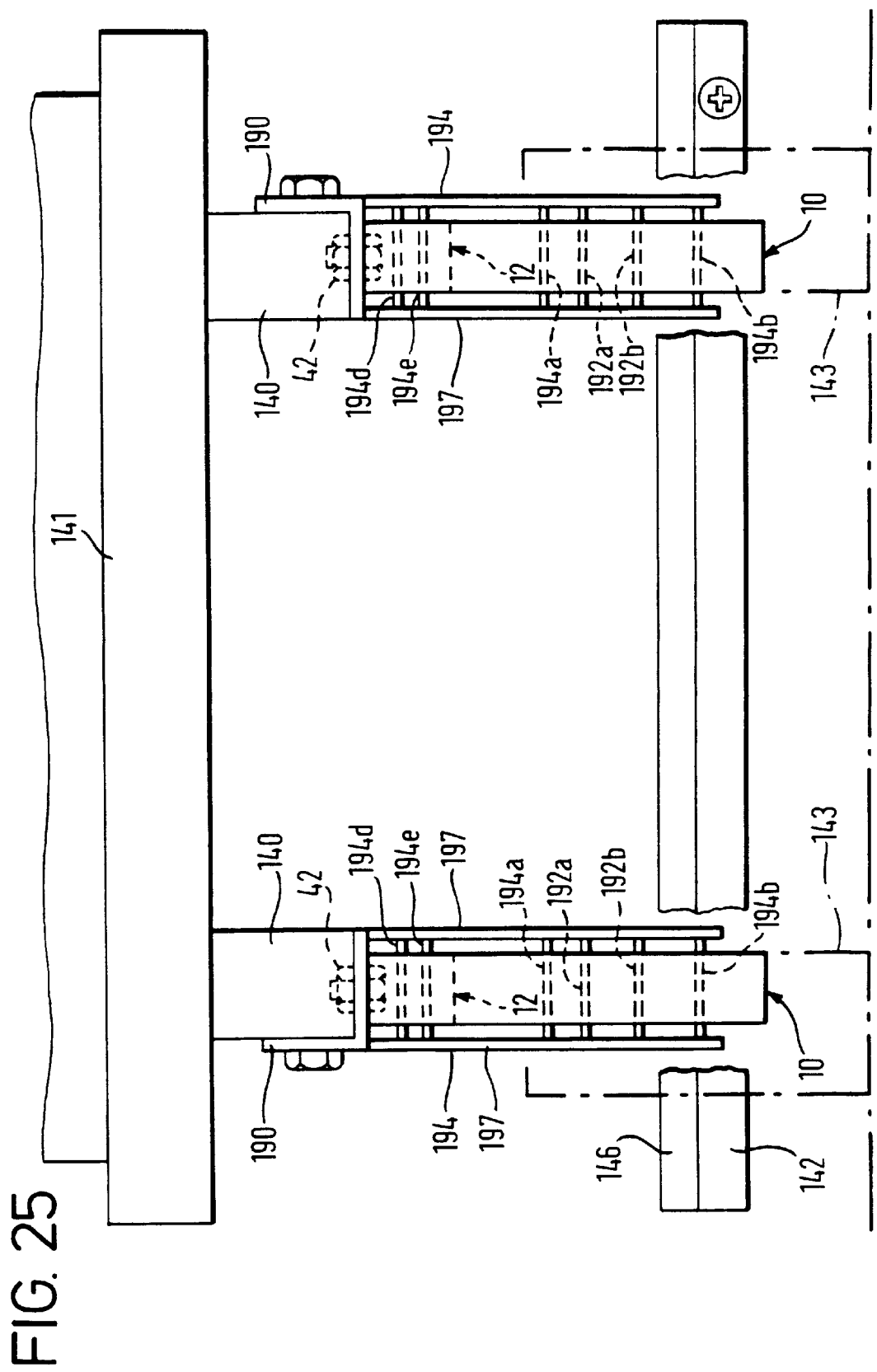

As shown in FIG. 25 the bumper bar 142 is supported by two spaced apart buffers each of which is associated with the stop members 192, 194. If the bumper bar 142 is struck from the rear, say, by a passenger vehicle, the vertical section 10 of the buffer is deflected forwardly as shown in broken lines in FIG. 24 to cushion the impact. Deflection of the vertical section 10 will absorb load until it contacts the front travel limit stops 192a, 192b which absorb the remaining load. It will be appreciated that the stops 192a, 192b are substantially solid so as not to deflect. By providing such a resilient buffer arrangement, damage to a vehicle impacting the bumper bar 142 is likely to be less than if impacting a solid non-energy absorbing device fastened to the commercial vehicle.

If the bumper bar 142 is impacted outboard of one of the buffers, for example at a point indicated at X in FIG. 25, the travel limit stops 194a, 194b associated with the opposite buffer will prevent the opposite end of the bumper bar 142 from moving rearwardly.

Looking at FIG. 24, the height H of the buffer is approximately 610 mm (24 inches) and the width W is approximately 380 mm (15 inches) the thickness T of the vertical and horizontal limbs 10, 12 is approximately 152 mm (6 inches). The thickness t of each spring loop 11, 11a is approximately 8 mm (0.323 inches). A single buffer loop made to those dimensions and manufactured from spring steel has been found to absorb 1170 kg (2575 lbs) when applied at a point Y 533 mm (21 inches) from the upper surface of limb 12 as viewed in FIG. 24 with a deflection of 127 mm (5 inches) without damage to the spring. By arranging two such loops 11, 11a nested one within the other as shown in FIG. 24, the buffer has been found to absorb approximately 2336 kg (5150 lbs) applied at Y with a deflection of 127 mm (5 inches).

The U.S. Federal Register Vol 61 No. 16 Wednesday Jan. 24 1996 49 CFR Part 571 requires rear bumpers on commercial vehicles to be located approximately 460 mm–560 mm (18–22 inches) above the ground and to be capable of withstanding a static 5188 kg (11240 lbs) horizontal load applied at 102 mm (4 inches) from the end of the bumper or at the centreline of the vehicle when applied over a 20 mm wide by 20 mm high (8 inches by 8 inches) area or to withstand a static 10,376 kg (22480 lbs) horizontal load at 355 mm or 508 mm (14 or 20 inches) from the centre line of the vehicle when applied over a 20 mm wide or 20 mm high (8 inches by 8 inches) area. All impacts must not deflect the bumper bar more than 127 mm (5 inches). The ruling of the Federal Register is aimed at reducing injury or death which can result from rear under-ride crashes where vehicles collide with trucks or trailers over 4536 kg (10,000 lbs) gross vehicle weight.

It will be seen from the above that the deflection of the buffer having the two loops 11, 11a when arranged and dimensioned as shown in FIG. 24 will absorb 46% of the proposed 5188 kg (11240 lbs) load requirement. The balance of the 5188 kg (11240 lbs) load applied at the centre or end location of the bumper bar 142 and the balance of the 10376 kg (22480 lbs) distributed to both buffers would be absorbed by the front travel limit stops 192a, 192b.

The buffers will rebound after absorbing impact from the rear without imparting any further damage to the impacting vehicle and without sustaining any damage to the bumper bar 142 provided that the loading applied is within the limits set out in the requirements of the above Federal Register ruling.

It will be appreciated that the mounting adaptor 190 can be designed and manufactured for any specific truck, trailer or other commercial vehicle whereby a completed kit comprising the buffers, bumper bar 142 and mounting adaptors 190 can be provided for a particular vehicle. For strength, the mounting adaptors 190 may be L-shaped in cross-section and may be formed from high strength angle plates which can be bolted to, say, the longitudinal chassis members 140 which support a load carrying section 141 and carry road wheels 143.

The bumper bar 142 will be dimensioned and positioned so as to comply with the above Federal Register ruling.

The above dimensions of the buffer can be varied to accommodate different loading requirements.

The buffers shown in FIGS. 1, 13, 17, 18 and 20 could also be arranged in the manner shown in FIGS. 24 and 25.

Whilst two loops 11, 11a have been shown nested one within the other, three or more loops may be nested together depending upon the strength of buffer required.

Figure 13:
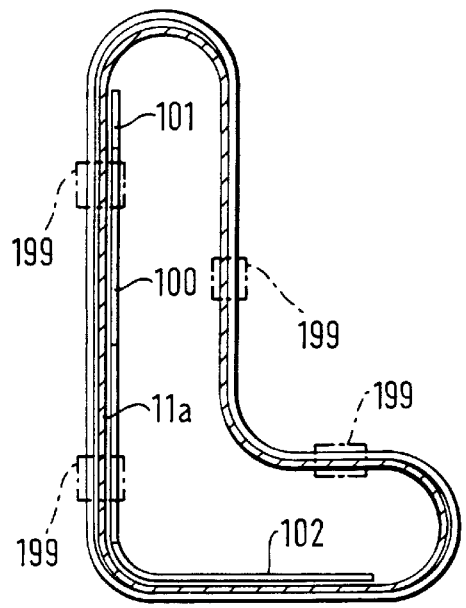
Figure 14:
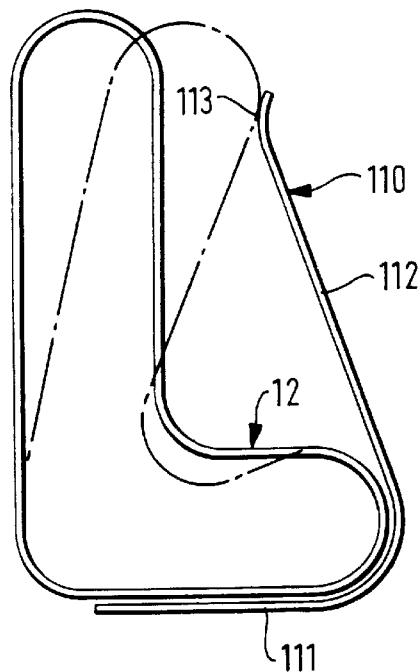
Figure 15:
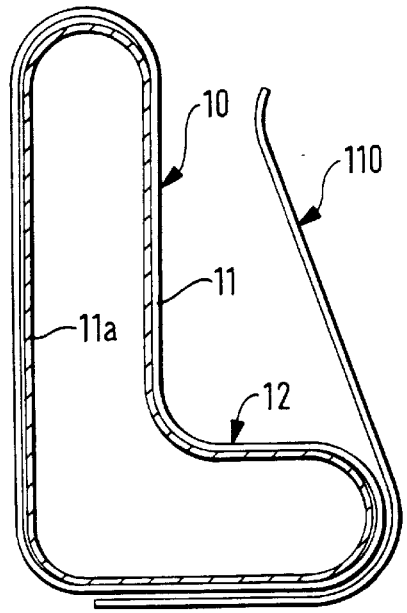
Figure 16:
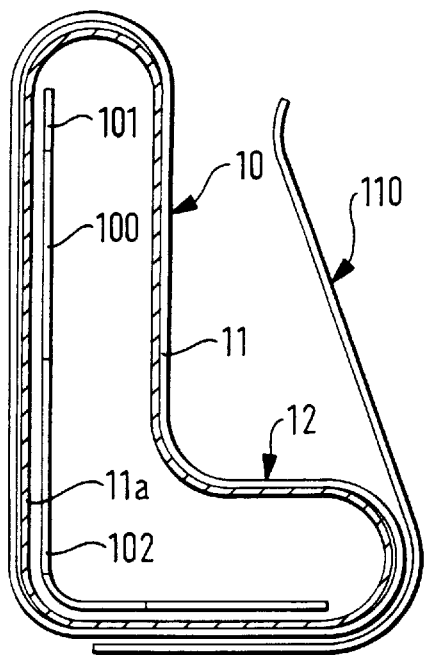

Whilst the nested loops have been described as being bolted together, they could be held together by suitable clips or bands 200 as indicated in broken lines in FIGS. 12 and 13 which wrap around the resilient components of the buffer.

Whilst the nested loops 11, 11a are preferably a close friction fit one within the other, the impact sections 10 thereof may be spaced apart slightly so that the outer loop 11 may deflect over a given distance before contacting the adjacent impact section 10 of the inner loop 11a. Similarly, the L-shaped resilient element 100 may have one of its limbs spaced from an adjacent limb of a loop of the buffer. Also, if desired, the nested loops 11, 11a may be a reasonably loose sliding fit one within the other instead of being a close friction fit.

Whilst the shorter section 12 of each L-shaped buffer described is shown as the fixing section and the section 10 the impact section, the longer section 10 could be the fixing section instead. In that case the shorter section 12 will be the impact section. Fixing holes may be provided in the limb 10 for the fixing bolts 42.

Figure 26:
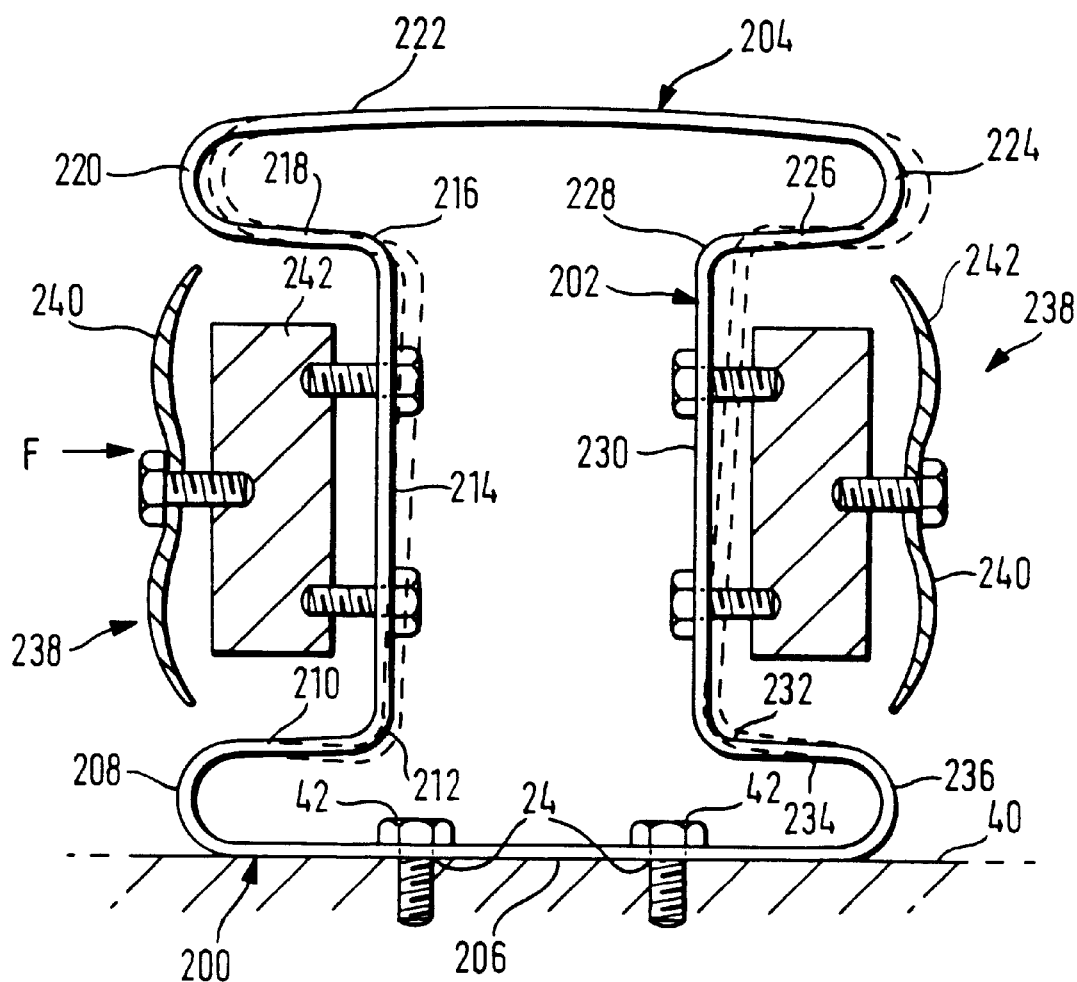

In FIG. 26 the buffer is of generally I-shaped form having a base 200, an elongate upstanding section 202 forming the web of the I-shape extending from the base and an elongate horizontal cross piece 204 extending across the top of the section 202.

As in the previous embodiments, the buffer is formed by bending a single strip of spring steel into the I-shaped form, the free ends of the strip being joined together by welding etc.

The base 200 of the buffer comprises a lower horizontal limb 206 providing a fixing section having fixing apertures 24 for fixing the buffer to a horizontal surface 40, such as the ground. The buffer is fixed to the horizontal surface 40 by means of bolts 42 through the fixing apertures 24.

In the following description references to left, right, upper and lower are to be construed as references to left and right, upper and lower as viewed in FIG. 26.

The buffer further comprises a first flex zone 208 bending into a left upper horizontal limb 210. A second flex zone 212 forms a corner between the left upper horizontal limb 210 and a left vertical limb 214 of the upstanding section 202. A third flex zone 216 forms a corner between the top of the left vertical limb 214 of the upstanding section 202 and a left lower limb 218 of the cross piece 204. A fourth flex zone 220 is provided between the left lower horizontal limb 218 of the cross piece and an upper horizontal limb 222 of the cross piece 204. The upper horizontal limb 222 of the cross piece is generally parallel with the lower horizontal limb 206 of the base 200. A fifth flex zone 224 is provided between the upper horizontal limb 222 and a right lower horizontal limb 226 of the cross piece. A sixth flex zone 228 lies between the right lower horizontal limb 226 of the cross piece 204 and the right vertical limb 230 of the upstanding section 202. A seventh flex zone 232 forms a corner between the right vertical limb 230 of the upstanding section 202 and a right upper horizontal limb 234 of the base 200. Finally, an eighth flex zone 236 is provided between the right upper horizontal limb 234 of the base and the lower horizontal limb 206 of the base.

Thus in the I-shaped buffer eight flex zones are provided for absorbing vehicle energy. The flex zones can flex either way to provide impact absorbtion in two directions. Deflection following application of a force F is shown by broken lines in FIG. 26.

In the embodiment shown in FIG. 26 a barrier assembly generally indicated at 238 is carried by the buffer, on each side thereof. The barrier assembly 238 comprises a barrier rail 240 mounted by means of fasteners such as bolts or rivets to a spacer block 242. The spacer block 242, in turn, is mounted to a vertical limb 214, 230 of the upstanding section 202, again by means of fasteners.

Thus in the FIG. 26 embodiment the buffer can be used to absorb impact energy from both sides. The buffer shown is particularly useful as a crash barrier between lanes of a dual carriageway or as a buffer in vehicle parking areas.

What is claimed is:

1. A resilient buffer formed from strip-like material comprising hollow elongate first and second sections which extend transverse to each other, the first section having spaced apart limbs, and the second section also having spaced apart limbs, the spaced apart limbs of the first section being joined at one pair of adjacent ends, the spaced apart limbs of the second section also being joined at one pair of adjacent ends, the spaced apart limbs of the first section being joined to the respective spaced apart limbs of the second section to form a closed loop open at the sides thereof so as to enable a force applied to the resilient buffer to cause relative flexing from the transverse alignment between the first and second sections to take place for shock absorption and to allow return to the transverse alignment after the force is removed.

2. A resilient buffer according to claim 1 in which the closed loop defines a plurality of flex zones about which flexing of the buffer occurs.

3. A resilient buffer according to claim 2 in which relative displacement between two of said flex zones occurs during flexing of the buffer.

4. A resilient buffer according to claim 2 in which at least one of the flex zones is formed at a juncture between the first and second sections.

5. A resilient buffer according to claim 2 in which the elongate first and second sections are arranged such that the closed loop is substantially L-shaped.

6. A resilient buffer according to claim 2 in which the elongate first and second sections are arranged such that the closed loop is substantially L-shaped and the flex zones are defined as the locations where the two sections are joined to form the L-shaped closed loop.

7. A resilient buffer according to claim 5 in which the L-shaped closed loop comprises two spaced apart L-shaped portions, each formed by a limb of each section connected by a flex zone, and two end portions that are the connections between the limbs of each section extending between ends of the two L-shaped portions.

8. A resilient buffer according to claim 7 in which the end portions comprise further flex zones.

9. A resilient buffer according to claim 1 in which the first section defines an impact section and the second section defines a fixing section.

10. A resilient buffer according to claim 9 in which the elongate first and second sections are arranged such that the closed loop is substantially L-shaped, the fixing section being shorter than the impact section of the L-shaped closed loop.

11. A resilient buffer according to claim 9 in which two fixing sections are defined by the second section, one said fixing section being transverse to the other.

12. A resilient buffer according to claim 11 in which the first and second fixing sections are arranged adjacent each other.

13. A resilient buffer according to claim 1 in which the closed loop is substantially I-shaped.

14. A resilient buffer according to claim 13 in which the first section forms a base of the I-shape and the second section forms an upstanding web of the I-shape, two said flexible zones being formed at a juncture between the base and the web.

15. A resilient buffer according to claim 14 in which the web forms an impact section of the buffer.

16. A resilient buffer according to claim 1 in which the buffer is associated with a resilient element for increasing the resistance to impact.

17. A resilient buffer comprising a closed loop of strip-like resilient material having a fixing section and an impact section transverse to the fixing section wherein a force applied to the impact section causes flexing of the buffer from its original configuration and permits return to the original condition when the force is removed, the loop of resilient material being associated with a resilient element for increasing the resistance to impact of the buffer.

18. A resilient buffer according to claim 17 in which the resilient element is arranged within the closed loop.

19. A resilient buffer according to claim 17 in which the resilient element takes the form of a second closed loop.

20. A resilient buffer according to claim 19 in which the two closed loops fit frictionally one within the other.

21. A resilient buffer according to claim 19 in which the inner closed loop is substantially similar in shape to the outer closed loop.

22. A resilient buffer according to claim 17 in which the resilient element comprises a length of resilient material which frictionally engages one or more internal or external surface portions of the closed loop.

23. A resilient buffer according to claim 17 in which the resilient element comprises a spring extending across the closed loop whereby deflection of the closed loop causes deflection of the spring thereby increasing the resistance to impact.

24. A resilient buffer according to claim 17 in which a rigid stop is provided, the rigid stop being positioned to limit movement of the buffer in deflection.

25. A resilient buffer according to claim 24 in which the stop comprises a first stop surface for limiting deflection of the buffer in deflection and a second stop surface for limiting or preventing deflection of the buffer in rebound.

26. A resilient buffer according to claim 24 in which the stop comprises a pair of rigid elongate members which are attached to a mounting at one end and which are joined together at opposite ends.

27. A resilient buffer according to claim 26 in which the elongate members have portions thereof which are cut away so as to leave respective stop surfaces.

28. A resilient buffer according to claim 25 in which one of the first and second sections of the buffer fits within the stop arrangement so that one of the limbs thereof lies between the respective stop surfaces.

29. A motor vehicle provided with a rear bumper bar comprising the resilient buffer according to claim 26.

30. The motor vehicle according to claim 29 in which the elongate members extend downwardly from the underside of a load carrying surface of the vehicle to which the buffer is attached.

31. A resilient buffer according to claim 24 in which the rigid stop has a stop surface which extends through the closed loop.

32. A resilient buffer according to claim 24 spaced from another resilient buffer comprising closed loop of strip-like resilient material having a fixing section and an impact section transverse to the fixing section wherein a force applied to the impact section causes flexing of the buffer from its original configuration and permits return to the original condition when the force is removed, the loon of resilient material being associated with a resilient element for increasing the resistance to impact of the buffer and wherein a rigid stop is provided, the rigid stop being positioned to limit movement of the buffer in deflection, the buffers being fixed to a mounting and having at least one common impact element mounted thereon.

33. A motor vehicle provided with a resilient buffer comprising:
- a motor vehicle;
- a resilient buffer comprising a closed loop of strip-like resilient material having a fixing section and an impact section transverse to the fixing section wherein a force applied to the impact section causes flexing of the buffer from its original configuration and permits return to the original condition when the force is removed, the loop of resilient material being associated with a resilient element for increasing the resistance to impact of the buffer and wherein a rigid stop is provided, the rigid stop being positioned to limit movement of the buffer in deflection, and wherein the buffer is mounted on a rear portion of the motor vehicle to reduce injury from rear under-ride impact.

34. A motor vehicle according to claim 33, wherein the vehicle has at least two spaced buffers thereon which carry a bumper element extending outwards beyond each buffer.

* * * * *